(12) United States Patent
Guichard

(10) Patent No.: US 8,289,180 B2
(45) Date of Patent: Oct. 16, 2012

(54) DEVICE AND METHOD FOR MANAGING CONFIGURATION AND FOR MANAGING MAINTENANCE OF APPARATUS

(75) Inventor: Philippe Guichard, Chabeuil (FR)

(73) Assignee: Thales, Neuilly sur Seine (FR)

( * ) Notice: Subject to any disclaimer, the term of this patent is extended or adjusted under 35 U.S.C. 154(b) by 715 days.

(21) Appl. No.: 12/516,863

(22) PCT Filed: Nov. 26, 2007

(86) PCT No.: PCT/EP2007/062826
§ 371 (c)(1),
(2), (4) Date: Sep. 1, 2009

(87) PCT Pub. No.: WO2008/065084
PCT Pub. Date: Jun. 5, 2008

(65) Prior Publication Data
US 2010/0066553 A1 Mar. 18, 2010

(30) Foreign Application Priority Data
Dec. 1, 2006 (FR) ...................................... 06 10527

(51) Int. Cl.
*G08B 17/00* (2006.01)
(52) U.S. Cl. ........................................ 340/654; 340/584
(58) Field of Classification Search .................. 340/654, 340/584, 286; 235/492
See application file for complete search history.

(56) References Cited

U.S. PATENT DOCUMENTS 6,898,489 B1 5/2005 Hayes
2004/0020994 A1* 2/2004 Muehl et al. .................. 235/492

FOREIGN PATENT DOCUMENTS

GB 2 424 151 9/2006
WO WO00/52550 9/2000
WO WO2005/125207 12/2005

* cited by examiner

*Primary Examiner* — Shirley Lu
(74) *Attorney, Agent, or Firm* — Lowe, Hauptman, Ham & Berner, LLP

(57) ABSTRACT

The subject of the invention is a device for managing configuration and for managing maintenance of apparatus. It relates to a device for managing configuration and maintenance of a number N of items of apparatus $EQ_i$ integrated into a system, i denoting an identification index for the apparatus $EQ_i$ and lying between 2 and N. The system includes a main computer RC. The apparatus $EQ_i$ exchanges data with the main computer RC through a communication network. The apparatus $EQ_i$ being able to be integrated into the system or to be removed from the system. According to the invention, the device includes at least one data concentrator C, N radio tags $ET_i$, each tag $ET_i$ is fixed securely to the apparatus EQi, a number M of communication nodes Nj, where j denotes an identification index for the communication node Nj, j lies between 2 and M, M is less than or equal to N. According to the invention, a communication node $N_j$ has a fixed position related to the system (1) and the node $N_j$ is devised so as to exchange data with radio tags $ET_i$ through a contactless link, all the nodes $N_j$ are linked to a data concentrator C by a wired link.

17 Claims, 2 Drawing Sheets

DEVICE AND METHOD FOR MANAGING CONFIGURATION AND FOR MANAGING MAINTENANCE OF APPARATUS

CROSS-REFERENCE TO RELATED APPLICATIONS

The present Application is based on International Application No. PCT/EP2007/062826, filed on Nov. 26, 2007, which in turn corresponds to French Application No. 0610527, filed on Dec. 1, 2006, and priority is hereby claimed under 35 USC §119 based on these applications. Each of these applications are hereby incorporated by reference in their entirety into the present application.

FIELD OF THE INVENTION

The field of the invention is that of configuration management and maintenance management of apparatus. The invention relates more precisely to electronic apparatus which is integrated into a system.

BACKGROUND OF THE INVENTION

The subject of the invention is a device for managing configuration and for managing maintenance apparatus.

Such configuration management and maintenance apparatus is identified by a configuration which is a reference describing the type to which the apparatus belongs, the serial number of the apparatus as well as a version of a piece of software contained by the apparatus. The configuration of an apparatus is able to evolve over time such as for example, subsequent to an upgrade to a piece of software of the apparatus. The creation of a configuration for an apparatus and the updating of the configuration so as to follow the upgrade of the apparatus is called "configuration management".

Moreover, maintenance teams are responsible for keeping systems operational based on messages originating from test devices built into the apparatus or on observations from system users so as to construct failure diagnostics, identify and/or locate failures and, if required, replace an apparatus that has failed in part or entirely. The gathering of the messages and observations serving to track down apparatus failures is called maintenance management.

The invention also relates to a method of managing apparatus configuration and a method of managing apparatus maintenance.

The architecture of complex systems is generally based on transfers of information cues between electronic apparatus linked together by a communication network. The location of the apparatus in the system sometimes meets severe dimensional specifications, the apparatus may be from about ten centimeters to several hundred meters away and be difficult to access. Such is the case for aeronautical systems mounted aboard aircraft (for example an avionics suite for broadcasting multimedia contents, known as "In-flight Entertainment" or by the acronym IFE) as well as industrial installations. The electronic apparatus integrated into a system generally possess a configuration which perfectly identifies the main components, software and hardware that they comprise to the constructor of the apparatus and to the system. The configuration takes the form of one or more identifiers which may be fixed on the apparatus, such as for example inscriptions on a tag stuck on the external surface of a wall of a housing protecting the apparatus. The configuration of an apparatus allows a maintenance team to replace a failed apparatus with a new apparatus comprising the same configuration or a configuration for which the constructor of the apparatus can guarantee that operation of the apparatus bearing it is compatible with the failed apparatus. The configuration also makes it possible to alert an apparatus constructor about a chronic failure of one of its items of apparatus. When the constructor is informed of all the failures encountered by his apparatus in operation, he may find that a frequency of a failure exceeds a certain threshold. Thus, he highlights a weakness of his apparatus and proposes a corrective measure common to all the apparatus of the same configuration and which are presumed to suffer from the same weakness.

An applicable configuration of a system is a list consisting of configurations of the various apparatus integrated into the system. The configuration of the apparatus can evolve over time, and one then speaks of system configuration management which is based on apparatus configuration management.

For systems designed before the 1970s, apparatus configuration management could generally be described as "static", that is to say the applicable configuration of a system reduced to a system configuration register, for example a document in paper form, which contained all the configurations of the apparatus integrated into the system. Any evolutionary upgrade of a configuration of one of the apparatus integrated into the system was logged manually in the configuration register.

The static character of this type of configuration management exhibits the drawback of making it very irksome to ultimate verify compatibility between the configuration of the apparatus integrated into a system and the applicable configuration of the system. It can be verified for example when turning on the system, and serves in this case to cover the risk constituted by erroneous replacement of a failed apparatus with an apparatus whose configuration is not in accordance with that logged in the configurations register. The erroneous replacement takes place between two power-ups of the system and must be detected as early as possible.

More recent design systems generally integrate configuration management and maintenance management that are termed "intelligent"; one also speaks of "intelligent systems".

"Intelligent" configuration management consists in storing the configuration of an apparatus in a memory internal to the apparatus. The configuration of the apparatus is transmitted while the system is powered up, before anything else, to a main computer of the system, by means of a communication network linking, for example in a star layout, the main computer and the apparatus of the system. The main computer verifies that the configurations that the items of apparatus transmit to it are compatible with the applicable configuration of the system which is previously stored in one of its internal memories.

In general, the apparatus of the "intelligent systems" comprise, furthermore, a built-in test device (known by the acronym BITE standing for built-in test apparatus). The built-in test device delivers messages containing information cues about the operation of the apparatus into which it is integrated through the communication network, destined for the main computer. "Intelligent" maintenance management consists in centralizing, in the main computer, reports about operating anomalies of the apparatus integrated into the system and in producing, on each shutdown of the system, a report which summarizes these anomalies and which may be usefully consulted by a maintenance team.

Nevertheless, "intelligent" configuration management and the management of "intelligent" apparatus maintenance each suffer from a drawback.

The configuration of the apparatus is stored in a memory internal to the apparatus, it can be known outside the apparatus only when the apparatus is powered and is linked to a communication network. Hence, when an apparatus has been removed from the system by a maintenance team, either because it has been identified as having failed, or when the apparatus is integrated into a system which is not powered, a maintenance team must necessarily resort to a test bench to access the apparatus configuration cue. A test bench is an installation which is devised so as to power and access the content of the memories internal to the apparatus. This installation is expensive and/or bulky and it is not always possible to transport the apparatus rapidly to a test bench. The delay taken to identify the configuration of an apparatus may impinge directly on the duration of unavailability of the apparatus, and can engender a duration of unavailability of a system which may turn out to be very expensive.

Concerning "intelligent" maintenance management, in the prior art, information cues are generally transmitted in the up-going direction, that is to say the messages are delivered by the built-in test devices integrated into the apparatus and are received by the main computer of the system. Certain information cues are conveyed in the down-going direction, that is to say: delivered by the main computer destined for the apparatus of the system. It should be noted that these information cues are accessible only if the apparatus are powered. Nevertheless, it may be very instructive, for a maintenance team which has extracted an apparatus from a system, to rapidly ascertain the applicable configuration of the system in which the apparatus was inserted and also the nature of the apparatus operating anomalies which were signalled to the main computer by the built-in test devices.

A first solution known for alleviating the drawbacks exhibited by "intelligent systems" is a configuration management and a maintenance management that are based on employing radio tags (or "RFID Tags" or else "Radio-Frequency Identification Tags").

A so-called passive radio tag is a component which has the capacity to store information cues and to communicate them, on request, by means of a contactless link, in general in the radio frequency stretch. When such a radio tag, in which a configuration cue pertaining to an apparatus has been stored, is stuck to the apparatus, it enables a maintenance team equipped with a radio tag reader/marker to access the configuration cue for the apparatus, even when the apparatus is not powered, and without resorting to a test bench. The radio tag is powered via an electromagnetic field which is generally provided by the radio tag reader/marker. Nevertheless, a radio tag stuck to an apparatus does not make it possible to transmit the configuration of the apparatus rapidly to the main computer in order for it to carry out the ultimate verification of compatibility between the configuration of the apparatus and the applicable configuration of the system. Indeed, the frequency stretch of the contactless link making it possible to communicate the radio tag is not suited to a communication over a long range, typically more than a few meters, for two essential reasons: the power supply decreases very rapidly with distance and the environment may attenuate or jam the radio link, especially if it comprises surfaces made of electrically conducting materials.

For the same reason, because a computer cannot deliver data, via the contactless link, to a radio tag that is a distance of greater than a meter away from it, maintenance management based solely on employing a radio tag does not constitute a solution to the problem of communication followed by storage of the messages delivered by the test devices integrated into radio tags, that is to say in a down-going direction.

FIG. 1 represents an "intelligent system" 1 according to the prior art, which comprises a main computer RC and a plurality of items of electronic apparatus $EQ_i$, each comprising at least one built-in test device $BITE_i$, i denotes an index identifying the apparatus.

Each apparatus $EQ_i$ is linked directly to the main computer RC by a communication network of the system. The communication network is in general wired, that is to say that the computer and the apparatus each comprise an electrical connector and that at least one electrical conducting cable links the connector of the main computer to the connector of the apparatus. The built-in test devices $BITE_i$ and the connectors are not represented in the figure.

On the communication network, the main computer RC exchanges data and commands with the electronic apparatus $EQ_i$. While power is supplied to the system, an apparatus configuration stored on a memory internal to the apparatus can furthermore be communicated to the main computer RC so that it verifies that the apparatus $EQ_i$ present do all indeed possess a configuration compatible with its own.

Messages of test results delivered by the built-in test devices $BITE_i$ are also transmitted on the communication network, in the up-going direction, that is to say the messages are delivered by the electronic apparatus $EQ_i$ and are intended for the main computer.

When a test result message contains a failure cue pertaining to an apparatus, for example a failure of the apparatus $EQ_1$, the system can, as a function of the type of failure, decide to use or to ignore the data and the commands delivered by the apparatus $EQ_1$, but in all cases it writes into a nonvolatile memory MVN of the main computer RC a reference of the apparatus that emitted the test result message, a content of the test result message and the date of receipt of the message by the main computer RC.

Later, in the course of a maintenance operation, the nonvolatile memory MVN is read by a maintenance team. The reading of the information cues stored in the nonvolatile memory MVN can serve for an analysis regarding the location in the system of the failed apparatus $EQ_1$ and regarding the nature of the failure. The reading of the content of the nonvolatile memory MVN can be carried out, for example, by means of a connector termed a "maintenance connector" disposed on the main computer RC, and provided for this purpose, on condition that the system is powered. The analysis leads to a diagnostic about the necessity to replace the failed apparatus $EQ_1$.

The nonvolatile memory MVN of the main computer RC and the maintenance connector are not represented.

When the maintenance team has located the failed apparatus $EQ_1$ and has extracted it from the system for replacement thereof, it must determine the configuration of the failed apparatus before replacing it. Accordingly, it can either read configuration information cues appearing in a system configuration register which remains in proximity to the system, or read configuration information cues appearing on a tag fixed to the apparatus, on condition that these information cues are up to date and reflect the actual configuration of the apparatus at the time of the failure.

Indeed, the apparatus are sometimes difficult to access in the systems and it is possible that all the software updates of an apparatus, usually carried out by a download across the communication network that has not given rise to a modification of the identifier of the configuration of the apparatus, for example, when it appears on a tag fixed to the apparatus.

SUMMARY OF THE INVENTION

The aim of the invention is to substantially alleviate these drawbacks. More precisely, it relates to a device for managing configuration and maintenance of a number N of items of apparatus $EQ_i$ (10, 20, 30) integrated into a system (1). i denotes an identification index for the apparatus $EQ_i$ (10, 20, 30) and lying between 2 and N. The system (1) includes a main computer RC (2), the apparatus $EQ_i$ (10, 20, 30) exchanging data with the main computer RC (2) through a communication network, the apparatus $EQ_i$ (10, 20, 30) being able to be integrated into the system (1) or to be removed from the system (1). The device includes at least one data concentrator C (100); a number N of radio tags $ET_i$ (11, 21, 31) with each radio tag $ET_i$ (11, 21, 31) is fixed securely to the apparatus $EQ_i$ (10, 20, 30). The device has a number M of communication nodes $N_j$ (12, 22, 32), where j denotes an identification index for the communication node $N_j$ (12, 22, 32) and j lies between 2 and M, M is less than or equal to N. A communication node $N_j$ (12, 22, 32) has a fixed position related to the system (1) and the node $N_j$ (12, 22, 32) is devised so as to exchange data with radio tags $ET_i$ (11, 21, 31) through a contactless link. All the nodes $N_j$ (12, 22, 32) are linked to a data concentrator C (100) by a wired link. The constructor of the system (1) communicates a first applicable configuration cue for the system (1) and a second identification cue for the system (1) to the data concentrator C (100) during delivery of the system (1). The data concentrator C (100) includes means for storing the first cue and the second cue; means for transmitting, via the wired links, the communication nodes $N_j$ (12, 22, 32) and the contactless links, the first cue and the second cue to all the radio tags $ET_i$ (11, 21, 31), on each interruption of power supply to the system (1).

A first advantage of this invention is the compatibility that the device according to the invention exhibits with existing "intelligent" systems. An exchange of data with a radio tag fixed securely to an apparatus can be performed although the apparatus is not powered: this exchange can therefore take place without interfering with the operation of the system, for example just before the apparatus is turned on or else when the power supply to the system is interrupted. The device according to the invention does not require a new certification of the apparatus to which a radio tag is fixed nor of the system, thus constituting a very significant economic advantage.

A second advantage of the invention is in the nature of the information that the device according to the invention is able to store. Information about the failures of the apparatus and system can be stored in the radio tag. This information is very useful for facilitating the understanding, by a maintenance team, of the nature and origin of a failure.

The invention also relates to a method of managing configuration of a number N of items of apparatus $EQ_i$ integrated into a system, i denoting an identification index for the apparatus $EQ_i$ and lying between 2 and N, a radio tag $ET_i$ being fixed securely to the apparatus $EQ_i$. The system processes an applicable configuration stored in a main computer RC belonging to the system. A configuration of the apparatus $EQ_i$ is stored in the tag $ET_i$. The main computer RC is linked to a data concentrator C. The data concentrator C is linked by wired links to a number M of communication nodes $N_j$, where j denotes an identification index for the communication node $N_j$ and, j lies between 2 and M, M is less than or equal to N. The communication node $N_j$ has a fixed position in the system and is devised so as to exchange data with the radio tags $ET_i$ through a contactless link.

The method includes the steps, on each commencement of power supply to the system.

All the tags $ET_i$ of the configuration of the apparatus $EQ_i$ transmit via the contactless links, the communication nodes $N_j$ and the wired links to the data connector C. The data concentrator C of the applicable configuration of the system (1). The applicable configuration of the system and of the configuration of the apparatus $EQ_i$ is compared. When a difference is detected the applicable configuration of the system and configurations of the apparatus $EQ_i$, of an alert is triggered the method includes on each interruption of power supply to the system, or on each receipt of an appropriate signal, a step of transmission, by the data concentrator C (100), to each tag $ET_i$ (11, 21, 31), via the wired links and the communication nodes $N_j$ (12, 22, 32), of a first applicable configuration cue for the system and of a second identification cue for the system.

Finally, the invention also relates to a method of managing maintenance of a number N of items of apparatus $EQ_i$ integrated into a system with i denoting an identification index for the apparatus $EQ_i$ and lying between 2 and N. A radio tag $ET_i$ is fixed securely to the apparatus $EQ_i$. The apparatus $EQ_i$ comprises a built-in test device $BITE_i$. The device $BITE_i$ delivers to a main computer RC belonging to the system messages of test results via a communication network of the system. The messages of test results are stored in a data concentrator C to which the main computer RC belonging to the system is linked. The data concentrator C is linked by wired links to a number M of communication nodes $N_j$, where j denotes an identification index for the communication node $N_j$, j lies between 2 and M, M is less than or equal to N, the communication node $N_j$ having a fixed position in the system and being devised so as to exchange data with the radio tags $ET_i$ through a contactless link.

The method being includes the steps, on each interruption of power supply to the system of transmitting by the data concentrator C to each tag $ET_i$, via the wired links and the communication nodes $N_j$, of the messages of test results; and storing the messages of test results transmitted to each tag $ET_i$ in a memory of the tag $ET_i$.

The invention also relates to a method of managing apparatus configuration and a method of managing apparatus maintenance.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE PREFERRED EMBODIMENTS

Figure 1:
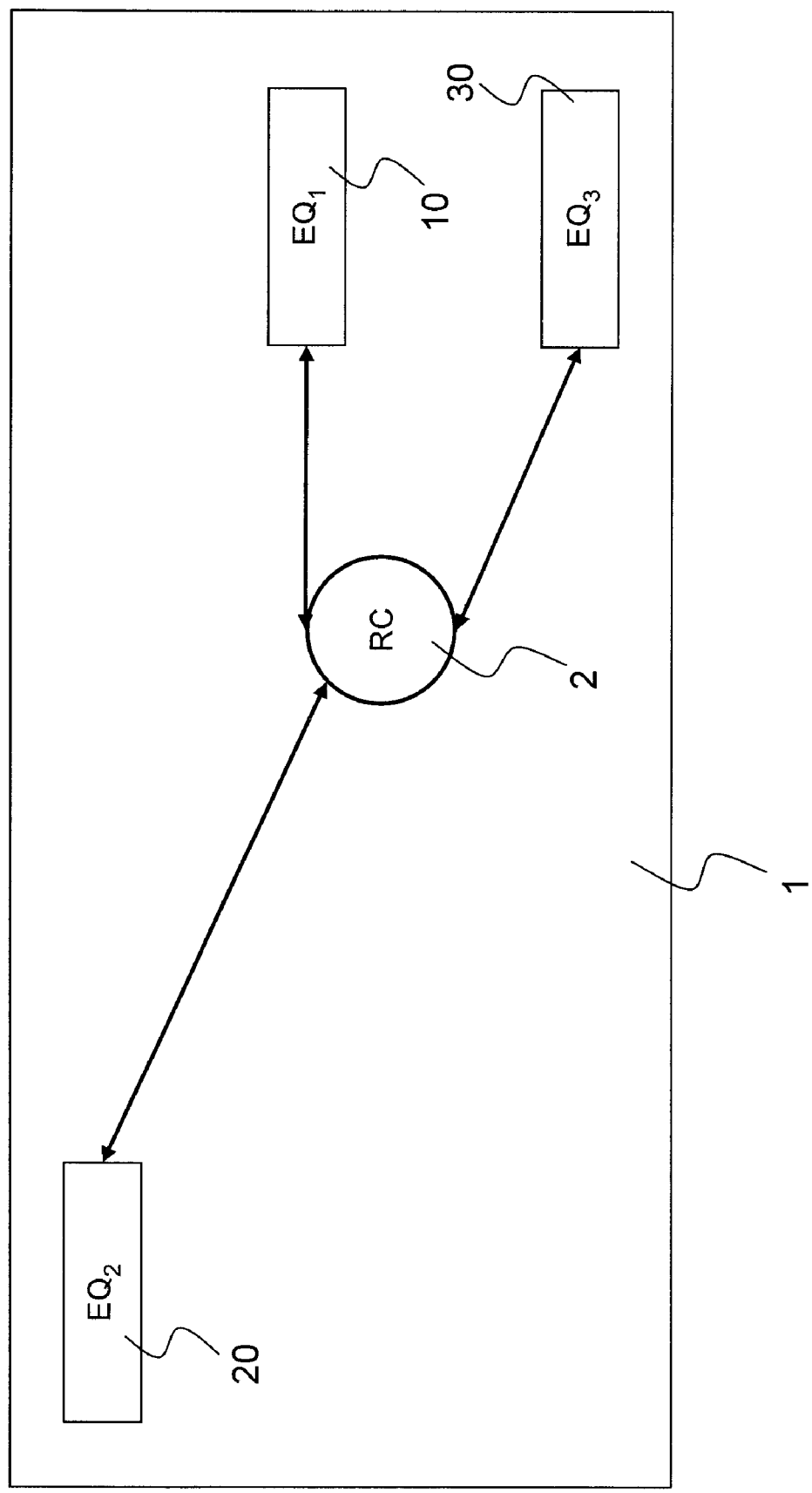
FIG. 1 schematically represents an "intelligent system" according to the prior art.
Figure 2:
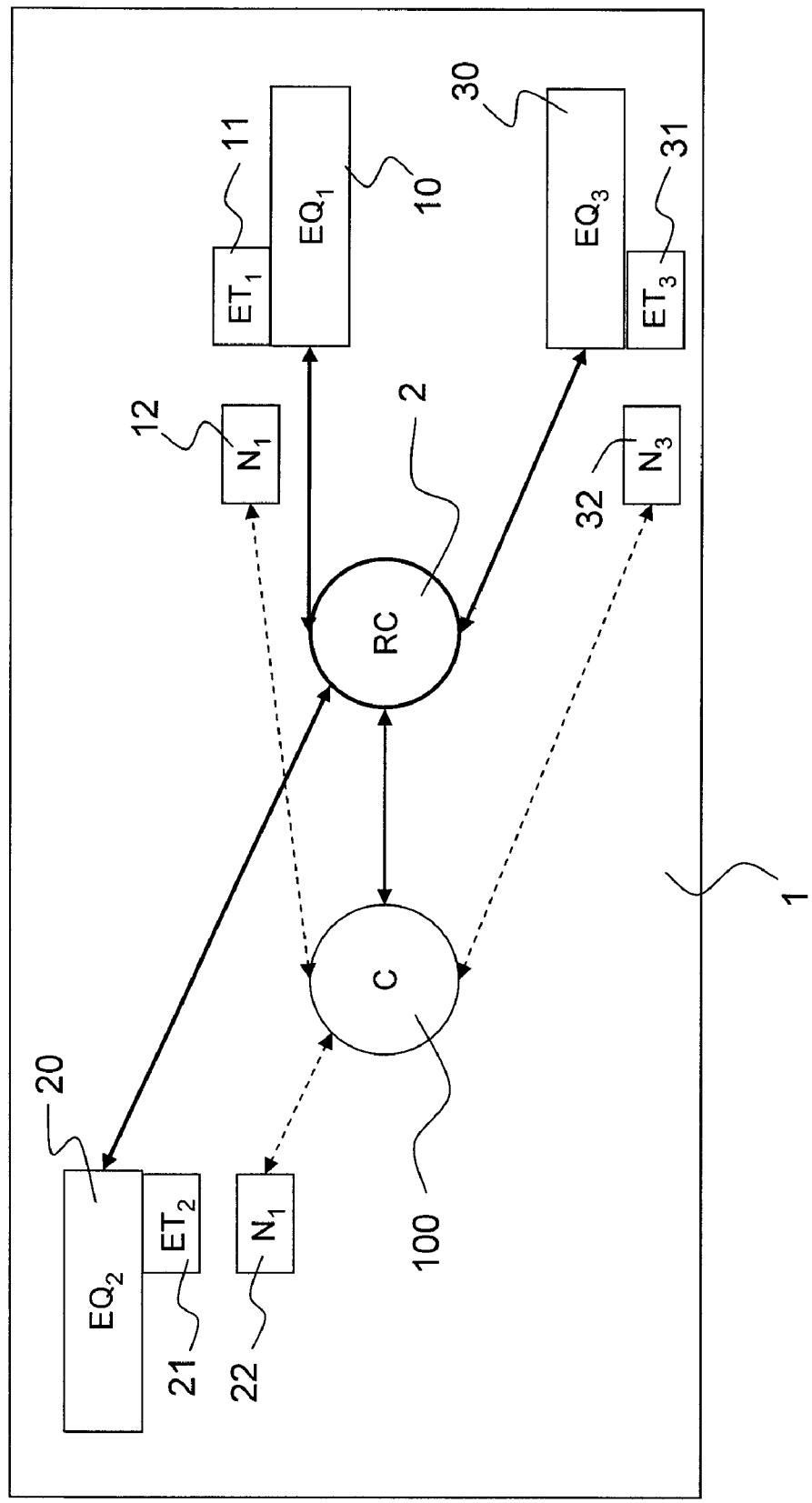
FIG. 2 schematically represents a system comprising a configuration management and maintenance management device according to the invention.

FIG. 2 represents an "intelligent system" 1, comprising a maintenance management and configuration management device according to the invention.

The system furthermore comprises a main computer RC and a plurality of items of electronic apparatus $EQ_i$, each comprising at least one built-in test device $BITE_i$, i denotes an index identifying the apparatus.

The device according to the invention comprises a data concentrator C, a number N of radio tags $ET_i$, each tag $ET_i$ is fixed securely to the apparatus $EQ_i$, and a number M of communication nodes $N_j$, where j denotes an identification index for the communication node $N_j$ and lies between 2 and M. The number of communication nodes M is less than or equal to the number N of tags. The number M is less than or equal to the number N.

A communication node $N_j$ occupies a fixed position in the system and each node $N_j$ is devised so as to exchange data with the radio tags $ET_i$ through a contactless link.

All the nodes $N_j$ are linked to at least one data concentrator C by a wired link.

Advantageously, when at least one radio tag $ET_i$ occupies a position preventing an exchange of data through the contactless link with one of the communication nodes, the said radio tag $ET_i$ has the capacity to exchange data with at least one communication node $N_j$.

Thus, a radio tag $ET_i$ that can store a configuration cue for the apparatus $EQ_i$ is disposed on each apparatus $EQ_i$. The cue stored in the radio tag $ET_i$ is accessible to a maintenance team equipped with a radio tag reader/marker. Access to the stored cue can take place even when the apparatus $EQ_i$ is not powered or when the apparatus is not integrated into the system. The radio tag reader/marker establishes a contactless link similar to that established by a communication node. In order for the maintenance team to access the cue stored in the tag $ET_i$, it is preferable for it to be possible to place the radio tag reader/marker in direct proximity to the tag $ET_i$, in view of the latter.

Advantageously, the radio tag $ET_i$ comprises:
a receiver $RE_i$ of data delivered by a communication node;
a memory $ME_i$ for storing data;
an emitter $EE_j$ for delivering data to a communication node, on request;
and the communication node $N_j$ comprises:
a receiver $RN_j$ of data delivered by a radio tag;
a memory $MN_j$ for storing data;
an emitter $EN_j$ for delivering data to a radio tag.

Initial storage of the configuration cue for the apparatus $EQ_i$ is carried out by a constructor of the apparatus by means of the radio tag reader/marker which comprises an emitter similar to that of the communication nodes. The cue which is delivered by the emitter of the reader/marker is written to the memory $ME_i$ of the radio tag $ET_i$. This write can take place when the apparatus $EQ_i$ is not powered or when the apparatus is not integrated into the system.

Subsequently, when the apparatus is integrated into the system, the configuration cue can be modified to reflect, for example, an update of a software component integrated into the apparatus $EQ_i$. Modification of the configuration cue is carried out by a maintenance team.

The maintenance team transmits a new configuration of the apparatus $EQ_i$ to the data concentrator C. The data concentrator transmits in its turn the new configuration to the communication nodes $N_j$ through the wired links. An emitter of at least one communication node writes the new configuration into the radio tag $ET_i$ or modifies the configuration stored in the memory of the radio tag $ET_i$.

A radio tag is a passive device which does not require a continuous power supply. A cue stored in the memory that it comprises is consultable remotely by a communication node or a radio tag reader/marker comprising a receiver similar to that of the communication nodes.

Consultation of the content of a radio tag comprises the following steps: a communication node transmits a radio message comprising a request to read desired information cues to the radio tag $ET_i$. The radio message comprises an energy E: a fraction of the energy E is employed by the radio tag to power the components that it comprises (receiver, memory and emitter), to interpret the request as commands and to execute the commands such as for example have the information cues desired be delivered by the emitter of the radio tag $ET_i$.

Thus, according to the nature of the radio message dispatched by a node $N_j$, the radio tag $ET_i$ for which the message is intended receives data through its receiver $ER_i$ and stores them in its memory $ME_i$, or else delivers by means of the emitter $EE_i$, through a contactless link, data stored previously in its memory $ME_i$.

In a preferential embodiment of the invention, the number M of communication nodes is equal to the number N of radio tags, and a communication node $N_i$ can exchange data with a single radio tag $ET_i$: one speaks of node $N_i$ associated with the radio tag $ET_i$.

Advantageously, the emitter $EN_i$ and the receiver $RN_i$ on the one hand and the emitter $EE_i$ and the receiver $RE_i$ on the other hand have positions such that the contactless link between the node $N_i$ and the tag $ET_i$ is exclusive and the exclusivity is related to a range in terms of distance of the contactless link which is on the one hand greater than a distance separating the emitter $EE_i$ and the receiver $RN_i$, and greater than a distance separating the emitter $EN_i$ and the receiver $RE_i$, and on the other hand, for all j different from i, is less than a distance separating the emitter $EE_j$ and the receiver $RN_i$, and less than a distance separating the emitter $EN_j$ and the receiver $RE_j$.

Advantageously, the emitter $EN_i$ and the receiver $RN_i$ on the one hand and the emitter $EE_i$ and the receiver $RE_i$ on the other hand have positions such that the contactless link between the node $N_i$ and the tag $ET_i$ is exclusive and in that the exclusivity is related to an angular selectivity of the contactless link.

In general, the apparatus $EQ_i$ are protected from impacts and severe environments by housings; such is the case for example for aeronautical computers which are distributed in chassis fitted to holds of an aircraft. The apparatus $EQ_i$ are integrated into the systems by a removable connection to the chassis. The communication nodes of the device according to the invention may, for example, be fixed to the chassis while the radio tags are fixed to an external wall of the housings, for example the wall which faces the chassis.

Advantageously, when a housing made of electrically conducting material protects the apparatus $EQ_i$, the radio tag $EQ_i$ is fixed to an external surface of a wall of the housing.

Advantageously, when a housing made of electrically insulating material protects the apparatus $EQ_i$, the radio tag $EQ_i$ is integrated inside a wall of the housing.

The wired links between the concentrator C and the communication nodes $N_i$ double, as it were, the communication network existing on the system. Thus for an embodiment of the device according to the invention comprising a main computer RC, a single concentrator C, and for which all the apparatus are linked to the communication network, there exist as many wired links between the concentrator and communication nodes as links of the communication network linking the main computer RC and the apparatus $EQ_i$.

Nevertheless, in another embodiment of the device according to the invention comprising a main computer RC, a single concentrator C, and for which there exist apparatus which are not linked to the communication network, a node of the device can read several radio tags some of which are not fixed to apparatus integrated into the system.

A device according to the invention therefore requires the deployment in a system of a network of wired links dedicated to the communication between a data concentrator C and radio tags $ET_i$ which is similar to the communication network of the system. An alternative solution to the deployment of the network of dedicated wired links consists in employing a part of the communication network of a prior art system to establish the wired links. For example, in prior art systems, the communication network comprises wired power supply links for powering the apparatus $EQ_i$ from the main computer RC. The data concentrator can therefore deliver data to the main computer which will transmit them to the apparatus $EQ_i$ by borrowing the wired power supply links by virtue of so-called carrier-current modulation technology. This alternative makes it possible to do without the deployment of a wired network, deployment possibly being expensive in the case of an installation of a device according to the invention on an existing system (retrofits).

Advantageously, the wired link linking the apparatus $EQ_i$ to the data concentrator C borrows a wired power supply link for powering the apparatus $EQ_i$.

The device according to the invention furthermore exhibits an advantageous effect at the apparatus maintenance management level. This advantageous effect consists of a speed-up and systematization of the transfers of information cues pertaining to apparatus failures destined for the constructor of the apparatus.

In one embodiment of the device according to the invention, the data concentrator comprises an energy source and means for communicating information outside the system, the means being powered by the energy source.

As was recalled above, the built-in test devices $BITE_i$ deliver messages of test results about the apparatus in which they are integrated. In the prior art, these messages are stored in the main computer RC and are consulted by maintenance teams during system servicing and maintenance phases.

According to the invention, when a power supply to the system is interrupted or on receipt of an appropriate signal such as for example the wheels touchdown signal for an aircraft, without any human intervention being necessary, the means for communicating automatically transmit to a database of the apparatus constructor all the messages of test results delivered by the built-in test devices $BITE_i$. These messages comprise information about an existence of a failure of an apparatus, about the nature of the failure, about the aggregate duration of operation of the apparatus and about the duration of power supply to the apparatus.

As soon as these messages are communicated, the constructor of the apparatus can identify the components that must be procured with a view to refurbishing or exchanging the apparatus. In this way, the logistics operations aimed at refurbishing the failed apparatus are speeded up, thereby reducing intervention deadlines. Moreover, a database of an apparatus constructor is filled in automatically so that he is better acquainted with the modes of failure of his apparatus, and can improve the operating dependability of his apparatus. The constructor's database is located on the ground in a fixed place and may be accessible, for example, by means of a telephone link.

Advantageously, the data concentrator C comprises an energy source independent of the system and means for communicating information outside the system, and the said means are powered by the independent source.

Advantageously, the data concentrator communicates with a maintenance database of a constructor of the system.

Through the aspects described above, the device according to the invention is employed to manage the maintenance of the apparatus integrated into a system, it also serves to manage the configuration of the apparatus and more precisely to ensure, when mounting an apparatus on a system or when replacing an apparatus of a system, that the configuration of the apparatus $EQ_i$ that is integrated into the system is compatible with the applicable configuration of the system, this applicable configuration being defined by the system constructor.

During delivery of a system comprising a device according to the invention, the system constructor defines a first applicable configuration cue for the system and a second identification cue for the system that it stores in the data concentrator C. In the course of the life of the system, the applicable configuration of the system can be modified, for example subsequent to evolution of configuration of one of the apparatus integrated into the system.

It is useful for the maintenance team to be acquainted with the first cue and with the second cue, so as to analyse by cross-checks whether a failure of a particular apparatus is related to the configuration of the system in which it is integrated. Hence, the first and the second information cues are automatically transmitted to the radio tags of the device, via the wired links and the communication nodes, during a procedure which accompanies each interruption of power supply to the system. Thus, during a servicing operation, a maintenance team will easily have access to these information cues by consulting the content of the memory of a radio tag with the aid of a radio tag reader/marker.

Advantageously, data stored on the radio tag $ET_i$ are accessible when the apparatus $EQ_i$ is not powered and/or when the apparatus $EQ_i$ is integrated into the system.

Advantageously, the data concentrator comprises:
means for storing the first cue and the second cue;
means for transmitting, via the wired links and the communication nodes $N_j$ and the contactless links, the first cue and the second cue to all the radio tags $ET_i$, on each interruption of power supply to the system.

The fact that the concentrator contains the first and the second cue enables a search for incompatibility between the configuration of the apparatus integrated into the system and the applicable configuration of the system. Indeed, a procedure accompanying each power-up of the system comprises a step of transmitting the configuration of each apparatus to the concentrator, a step of comparison by the concentrator of these apparatus configurations with the applicable configuration of the system, and when a difference between the configurations of the apparatus and the applicable configuration of the system is detected, triggering of an alert.

Advantageously, the data concentrator comprises means for detecting an incompatibility between a configuration cue pertaining to an apparatus $EQ_i$ and the first configuration cue.

Advantageously, the data concentrator comprises means for transmitting to the tag $ET_i$, on each interruption of power supply to the system or on each receipt of an appropriate signal, via the wired links and the communication nodes $N_j$, third information cues about a duration of operation of the apparatus $EQ_i$ and fourth information cues about a duration of power-up of the apparatus $EQ_i$, and the third information cues and the fourth information cues are stored in a memory of the tag $ET_i$.

Consider an intelligent system comprising apparatus $EQ_i$ and a device according to be the invention. The apparatus $EQ_i$ comprise built-in test devices $BITE_i$, delivering messages of test results comprising information cues about an operating state of the apparatus $EQ_i$ to a main computer of the system via a communication network of the system.

Advantageously, the main computer RC of the system delivers messages of test results to a data concentrator C and at each power-down of the system or on each receipt of an appropriate signal the data concentrator C transmits, via the wired links and the communication node $N_j$, the messages of tests results comprising information cues about the operating state of the apparatus $EQ_i$ to the radio tag $ET_i$.

Third information cues about an aggregate duration of operation of the apparatus $EQ_i$ and fourth information cues about an aggregate duration of power supply to the apparatus $EQ_i$ are stored in the data concentrator while the system is in operation, Advantageously, the configuration management method comprises, on each interruption of power supply to the system or on each receipt of an appropriate signal, a step of transmission, by the data concentrator C, to each tag $ET_i$, via the data concentrator C (100), the wired links and the communication nodes $N_j$, third information cues and fourth information cues.

In another embodiment of the device according to the invention, the radio tags $ET_i$ comprise one or more sensors of a physical quantity, for example a speed-up, temperature or vibration sensor and means for sampling measurements delivered by the measurement sensor or sensors. The sampled measurements constitute sampled measurements which are stored in the memory $ME_i$ of the radio tag $ET_i$. The sampled measurements are accessible in the same manner as the data stored in memory $ME_i$ of the radio tag.

In the present embodiment, a radio tag furthermore comprises an energy source exclusively powering the measurement sensor or sensors.

Advantageously, at least one of the radio tags $ET_i$ comprises:
- at least one sensor for measuring a physical quantity delivering a measurement signal;
- means for sampling the measurement signal and producing sampled measurements.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. Device for managing configuration and maintenance of a number N of items of apparatus $EQ_i$ integrated into a system, i denoting an identification index for the apparatus $EQ_i$ and lying between 2 and N, the system comprising, furthermore, a main computer RC, the apparatus $EQ_i$ exchanging data with the main computer RC through a communication network, the apparatus $EQ_i$ being able to be integrated into the system or to be removed from the system, said device comprising:
- at least one data concentrator C (100);
- a number N of radio tags $ET_i$, each radio tag $ET_i$ being fixed securely to the apparatus $EQ_i$;
- a number M of communication nodes $N_j$, where j denotes an identification index for the communication node $N_j$, j lies between 2 and M, M is less than or equal to N,
and in that a communication node $N_j$ has a fixed position related to the system and that the node $N_j$ is devised so as to exchange data with radio tags $ET_i$ through a contactless link, all the nodes $N_j$ are linked to a data concentrator C by a wired link;

in which:
- the constructor of the system communicating a first applicable configuration cue for the system and a second identification cue for the system to the data concentrator C during delivery of the system, the data concentrator C comprises:
  - means for storing the first cue and the second cue;
  - means for transmitting, via the wired links, the communication nodes $N_j$ and the contactless links, the first cue and the second cue to all the radio tags $ET_i$, on each interruption of power supply to the system;
- wherein: at least one radio tag $ET_i$ occupying a position preventing an exchange of data through the contactless link with one of the communication nodes, the radio tag $ET_i$ has the capacity to exchange data with at least one communication node $N_j$.

2. The device according to claim 1, wherein the radio tag $ET_i$ comprises:
- a receiver $RE_i$ of data delivered by a communication node;
- a memory $ME_i$ for storing data;
- an emitter $EE_j$ for delivering data to a communication node $N_j$, on request;
and in that the communication node $N_j$ comprises:
- a receiver, $RN_j$ of data delivered by a radio tag;
- a memory, $MN_j$ for storing data;
- an emitter $EN_j$ for delivering data to a radio tag.

3. The device according to claim 2, wherein the number M of communication nodes $N_j$ is equal to the number N of radio tags, the node $N_i$ being associated with the tag $ET_i$, wherein the emitter $EN_i$ and the receiver $RN_i$ the emitter $EE_i$ and the receiver $RE_i$ have positions such that the contactless link between the node $N_i$ and the tag $ET_i$ is exclusive and in that the exclusivity is related to an angular selectivity of the contactless link.

4. The device according to claim 2, wherein the number M of communication nodes $N_j$ is equal to the number N of radio tags, the node $N_i$ being associated with the tag $ET_i$, wherein the emitter $EN_i$ and the receiver $RN_i$ the emitter $EE_i$ and the receiver $RE_i$ have positions such that the contactless link between the node $N_i$ and the tag $ET_i$ is exclusive and in that the exclusivity is related to a range in terms of distance of the contactless link which is on the one hand greater than a distance separating the emitter $EE_i$ and the receiver $RN_i$ and greater than a distance separating the emitter $EN_i$ and the receiver $RE_i$, and on the other hand, for all j different from i, is less than a distance separating the emitter $EE_j$ and the receiver $RN_i$ and less than a distance separating the emitter $EN_i$ and the receiver $RE_j$.

5. The device according to claim 1, wherein when a housing made of electrically conducting material protects the apparatus $EQ_i$, the radio tag $EQ_i$ is fixed to an external surface of a wall of the housing.

6. The device according to claim 1, wherein when a housing made of electrically insulating material protects the apparatus $EQ_i$, the radio tag $ET_i$ is integrated inside a wall of the housing.

7. The device according to claim 1, the communication network comprises wired power supply links for powering the apparatus $EQ_i$ from a main computer RC, characterized in that the wired link linking the apparatus $EQ_i$ to the data concentrator C borrows a wired link for powering the apparatus $EQ_i$.

8. The device according to claim 1, wherein the data concentrator C comprises an energy source independent of the system and of the means for communicating information outside the system, and in that the means are powered by the independent source.

9. The device according to claim 7, wherein the data concentrator C communicates with a maintenance database of a constructor of the system.

10. The device according to claim 1, wherein the data concentrator C comprises means for detecting an incompatibility between a configuration cue pertaining to an apparatus $EQ_i$ and the first configuration cue.

11. The device according to claim 2, wherein data stored on the radio tag $ET_i$ are accessible when the apparatus $EQ_i$ is not powered and/or when the apparatus $EQ_i$ is integrated into the system.

12. The device according to claim 1, wherein the data concentrator C transmits to the radio tag $ET_i$, on each interruption of power supply to the system or on each receipt of an appropriate signal, via the wired links and the communication nodes $N_j$, third information cues about a duration of operation of the apparatus $EQ_i$ and fourth information cues about a duration of power supply to the apparatus $EQ_i$, and in that the third information cues and the fourth information cues are stored in a memory of the radio tag $ET_i$.

13. The device according to claim 2, wherein apparatus $EQ_i$ comprising built-in test devices $BITE_i$, a device $BITE_i$ delivering messages of test results comprising information cues about an operating state of the apparatus $EQ_i$ to a main computer RC, via a communication network of the system, characterized in that the main computer RC delivers messages of test results to a data concentrator C and in that, on each interruption of power supply to the system, the data concentrator C transmits, via the wired links and the communication node $N_j$, the messages of test results comprising information cues about the operating state of the apparatus $EQ_i$ to the radio tag $ET_i$.

14. The device according to claim 2, wherein at least one of the radio tags ET.sub.i comprises: at least one sensor for measuring a physical quantity which delivers a measurement signal; means for sampling the measurement signal and producing sampled measurements.

15. A method of managing configuration of a number N of items of apparatus $EQ_i$ integrated into a system, i denoting an identification index for the apparatus $EQ_i$ and lying between 2 and N, a radio tag $ET_i$ being fixed securely to the apparatus $EQ_i$, the system possessing an applicable configuration stored in a main computer RC belonging to the system, a configuration of the apparatus $EQ_i$ being stored in the tag $ET_i$, the main computer RC being linked to a data concentrator C, the data concentrator C being linked by wired links to a number M of communication nodes $N_j$, where j denotes an identification index for the communication node $N_j$, j lies between 2 and M, M is less than or equal to N, the communication node $N_j$ having a fixed position in the system and being devised so as to exchange data with the radio tags $ET_i$ through a contactless link, the method comprising, furthermore, the steps, on each commencement of power supply to the system:

transmission to the data concentrator C by all the tags $ET_i$ of the configuration of the apparatus $EQ_i$ via the contactless links, the communication nodes $N_j$ and the wired links;

transmission to the data concentrator C of the applicable configuration of the system;

comparison of the applicable configuration of the system and of the configuration of the apparatus $EQ_i$;

when a difference is detected the applicable configuration of the system and configurations of the apparatus $EQ_i$, triggering of an alert, and the said method comprising on each interruption of power supply to the system, or on each receipt of an appropriate signal, a step of transmission, by the data concentrator C, to each tag $ET_i$, via the wired links and the communication nodes $N_j$, of a first applicable configuration cue for the system and of a second identification cue for the system, the said method being characterized in that when at least one radio tag $ET_i$ occupies a position preventing an exchange of data through the contactless link with one of the communication nodes, the radio tag $ET_i$ has the capacity to exchange data with at least one communication node $N_j$.

16. A method of managing maintenance of a number N of items of apparatus $EQ_i$ integrated into a system, i denoting an identification index for the apparatus $EQ_i$ and lying between 2 and N, a radio tag $ET_i$ being fixed securely to the apparatus $EQ_i$, the apparatus $EQ_i$ comprising a built-in test device $BITE_i$, the device $BITE_i$ delivering to a main computer RC belonging to the system messages of test results via a communication network of the system, the messages of test results being stored in a data concentrator C to which the main computer RC is linked, the data concentrator C being linked by wired links to a number M of communication nodes $N_j$, where j denotes an identification index for the communication node $N_j$, j lies between 2 and M, M is less than or equal to N, the communication node $N_j$ having a fixed position in the system and being devised so as to exchange data with the radio tags $ET_i$ through a contactless link, the method comprising the steps, on each interruption of power supply to the system:

transmission by the data concentrator C to each tag $ET_i$, via the wired links and the communication nodes $N_j$, of the messages of test results, storage of the messages of test results transmitted to each tag $ET_i$ in a memory of the tag $ET_i$.

17. The method of managing maintenance according to claim 16, third information cues about an aggregate duration of operation of the apparatus $EQ_i$ and fourth information cues about an aggregate duration of power supply to the apparatus $EQ_i$ being stored in the data concentrator C during operation of the system, comprising, on each interruption of power supply to the system, or on each receipt of an appropriate signal, a step of transmission, by the data concentrator C, to each tag $ET_i$, via the data concentrator C, the wired links and the communication nodes $N_j$, of the third information cues and of the fourth information cues.

* * * * *